No. 838,994. PATENTED DEC. 18, 1906.
R. O. HOOD.
SPARK PLUG.
APPLICATION FILED MAR. 9, 1904.
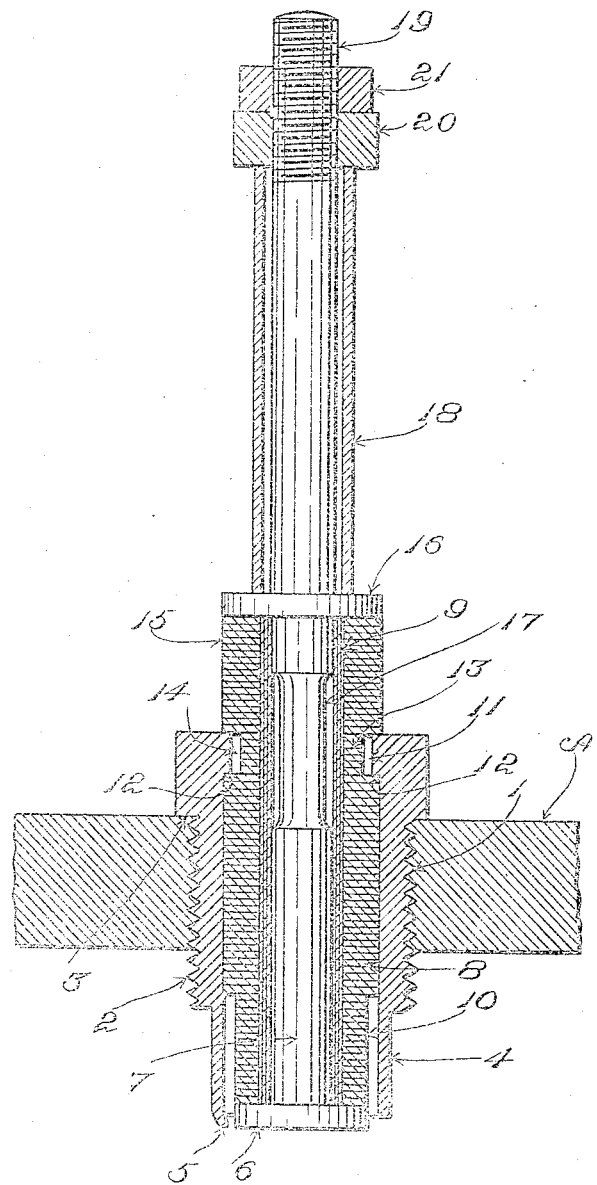
Witnesses:
Oscar F. Hill
J. Henry Parker
Inventor:
Ralph O. Hood,
by Macleod, Calver & Randall
Attorneys.

UNITED STATES PATENT OFFICE.

RALPH O. HOOD, OF DANVERS, MASSACHUSETTS, ASSIGNOR OF ONE-HALF TO WARREN D. KING, OF PEABODY, MASSACHUSETTS.

SPARK-PLUG.

No. 838,994.   Specification of Letters Patent.   Patented Dec. 18, 1906.

Application filed March 9, 1904. Serial No. 197,321.

*To all whom it may concern:*

Be it known that I, RALPH O. HOOD, a citizen of the United States, residing at Danvers, in the county of Essex, State of Massachusetts, have invented a certain new and useful Improvement in Spark-Plugs, of which the following is a specification, reference being had therein to the accompanying drawing.

My invention has for its object to provide an improved spark-plug for gasolene-engines and the like.

My spark-plug is so arranged that it may be readily removed as a whole whenever it is necessary to clean it or to examine the sparking points. It is also so devised that perfect insulation of the various parts is maintained under all conditions of temperature.

The invention will be readily understood from the following description, in which reference is made to the accompanying drawing, and the novel features thereof are pointed out, and clearly defined in the claims at the close of this specification.

The drawing shows a spark-plug embodying my invention, partly in vertical section and partly in elevation.

Referring to the drawing, A represents a portion of the engine-cylinder into which the spark-plug is screwed, as shown at 1. The exterior cylindrical casing, which surrounds and protects the interior portions of the spark-plug, is shown at 2. Within this casing and insulated from it in a manner hereinafter more particularly described is a stem 7, provided with a head 6 at its lower end. The casing 2 is of a greater diameter outside the cylinder and is preferably provided with a shoulder 3, which bears against the exterior of the engine-cylinder when the spark-plug is screwed home. The threaded portion of the spark-plug casing is of somewhat less diameter, as shown, and at the lower end below said threaded portion of the said spark-plug casing it is of still less diameter, as shown at 4. At the end of the portion 4 a point or lip 5 is provided which is bent inwardly, as shown, leaving a small space or break between said lip 5 and the head or lower end 6 of the stem 7. The ignition-spark, by means of which the mixture of air and gas in the engine-cylinder is exploded, is formed by the passage of the electric current across the space between the point or projection 5 and the head of the stem 7. As will be understood by those skilled in the art, the stem 7 and the casing 2 are connected electrically in any well-known manner with a proper source of electric energy.

The spark-plug casing 2 is provided with a longitudinal opening therethrough for the reception of the stem 7 and its surrounding insulation. The opening of the said casing 2 (shown at 11) is contracted at the top, forming a shoulder at 12. The insulation surrounding the stem 7 is preferably formed from laminated mica in the form of washers. The stem 7 above the head 6 is wound or covered with sheets of mica, (shown at 9,) which are wrapped about the stem. Outside of this mica wrapping 9 and immediately above the head 6 of the stem 7 is a series of washers of mica, which are superimposed and pressed together. The lowermost series of these washers is shown at 10 and is of substantially the diameter of the head 6 of the stem 7, which diameter is less than the interior of the surrounding portion 4 of the casing, thus affording an air-space outside of the washers across which the spark is projected.

Above the series of washers 10 is another series 8, which are of a diameter equal to the interior diameter or bore of the casing 2 and fill the space between the mica wrapping 9 about the stem 7 and the interior wall of the said casing 2. These washers 8 also press firmly against the shoulder 12, as will be later explained, and prevent the leakage of gas about the spark-plug from the interior of the cylinder. Next above the series of washers 8 is another series of washers 13 of a diameter somewhat less than the diameter of the contracted portion of the casing 2. Above this series of mica washers 12 is a fourth series 15 of similar washers of a diameter greater than the interior diameter of the contracted portion of the casing 2. In practice I make these washers 15 of the same diameter as the washers composing the series 8. By making the series 13 of a less diameter than the two adjacent series 8 and 15 an annular groove, suitable for the reception of the contracted portion of the casing 2, is formed in the body of insulation. The series of washers 15 extend upwardly to a metal disk or washer 16, the distance which this disk is placed above the upper edge of the casing 2 being determined by the length of the stem 7 and the other parts of the device.

The layer of insulating-washers 13 may, if desired, be omitted altogether, in which case the layer 15 is compressed between the upper surface of the casing 2 and the washer 16, while the layers 8 and 10 are compressed between the shoulder 12 and the head 6 of the stem 7; but in practice I prefer to employ a layer 13 of such thickness that the whole mass of insulation will be compressed between the washer 16 and the head 6, as well as against the upper and lower surfaces of the contracted portion 12 of the casing 2. This may be easily accomplished by adding washers to the layer 13 one at a time until the right thickness is obtained. The whole is formed into a solid body firmly united to the casing 2 and insures electrical insulation of the parts without danger of leakage of gas.

The stem 7 is made smaller in diameter, as shown at 17, for a portion of its length which is opposite the contracted opening 11 at the top of the casing 2, thereby increasing the distance between the said stem and the proximate wall or portion of the top of the casing 2 and increasing the insulation at this point, where there is great danger of leakage.

Above the disk 16 the stem 7 is surrounded for a considerable portion of its length by a cylinder or sleeve 18, the upper end of which rests against a head or nut 20, threaded upon the stem 7. There is also provided a check-nut 21 for additional security. By screwing down the nut 20 the insulating-washers composing the body of insulation about the stem 7 and within the casing 2 are firmly compressed, it being possible to apply great pressure, so that the insulation is as completely solidified as possible.

The sleeve 18 is preferably made of brass or other metal having a coefficient of expansion greater than that of the stem 7, the stem 7 being preferably made of iron or steel. By making the sleeve 18 of a proper length with relation to the length of the stem 7, which has a less coefficient of expansion, the total expansion of the sleeve 18 and the stem 7 may be made almost exactly the same, so that the washers composing the body of insulation about the stem are subjected to a constant pressure regardless of the temperature to which the spark-plug is exposed. This is particularly desirable, since spark-plugs for use in explosion-engines are subjected to very great variations in temperature and it has been found difficult to provide insulation for the parts of the spark-plugs which shall be unaffected by the changes in length of the different parts.

By the employment of my invention a very durable spark-plug in which the stem is at all times maintained in complete insulation from the casing is obtained at a minimum of expense. The construction also insures great uniformity in the expansion of the space where the break in the current occurs and the spark is formed.

What I claim is—

1. In a spark-plug, the combination of a stem provided with heads at both ends, a sleeve about the said stem, insulation between one end of the sleeve and the corresponding head of the stem, and a casing about the said insulation and having a shoulder engaging a corresponding groove in the body of insulation and forming a gas-tight joint therewith.

2. In a spark-plug, the combination of a casing provided with an interior shoulder, a stem provided with heads at both ends, insulation about the said stem and between one of its heads and the shoulder of the said casing, a sleeve about the said stem and abutting against its other head, and insulation between the end of the sleeve and the exterior of the casing.

3. In a spark-plug, the combination of a casing provided with an interior shoulder, a stem provided with heads at both ends and a contracted portion at a point about opposite the said shoulder on the stem, insulation about the said stem and between one of its heads and the shoulder of the said casing, a sleeve about the said stem and abutting against its other head and insulation between the end of the sleeve and the exterior of the casing.

4. In a spark-plug, the combination of a stem provided with heads at both ends, a sleeve about the said stem, made of metal having a greater coefficient of expansion than the said stem and proportioned in length to have an expansion substantially equal to that of the stem, insulation between one end of the sleeve and the corresponding head of the stem, and a casing about the said insulation and having a shoulder engaging a corresponding groove in the body of insulation and forming a gas-tight joint therewith.

5. In a spark-plug, the combination of a casing provided with an interior shoulder, a stem provided with heads at both ends, insulation about the said stem and between one of its heads and the shoulder of the said casing, a sleeve about the said stem and abutting against its other head, said sleeve being made of metal having a greater coefficient of expansion than the said stem and proportioned in length to have an expansion substantially equal to that of the stem, and insulation between the end of the sleeve and the exterior of the casing.

In testimony whereof I affix my signature in presence of two witnesses.

RALPH O. HOOD.

Witnesses:
GEORGE P. DIKE,
WILLIAM A. COPELAND.